March 4, 1924.
L. K. DE BUS
MEASURING DEVICE
Filed June 24, 1921
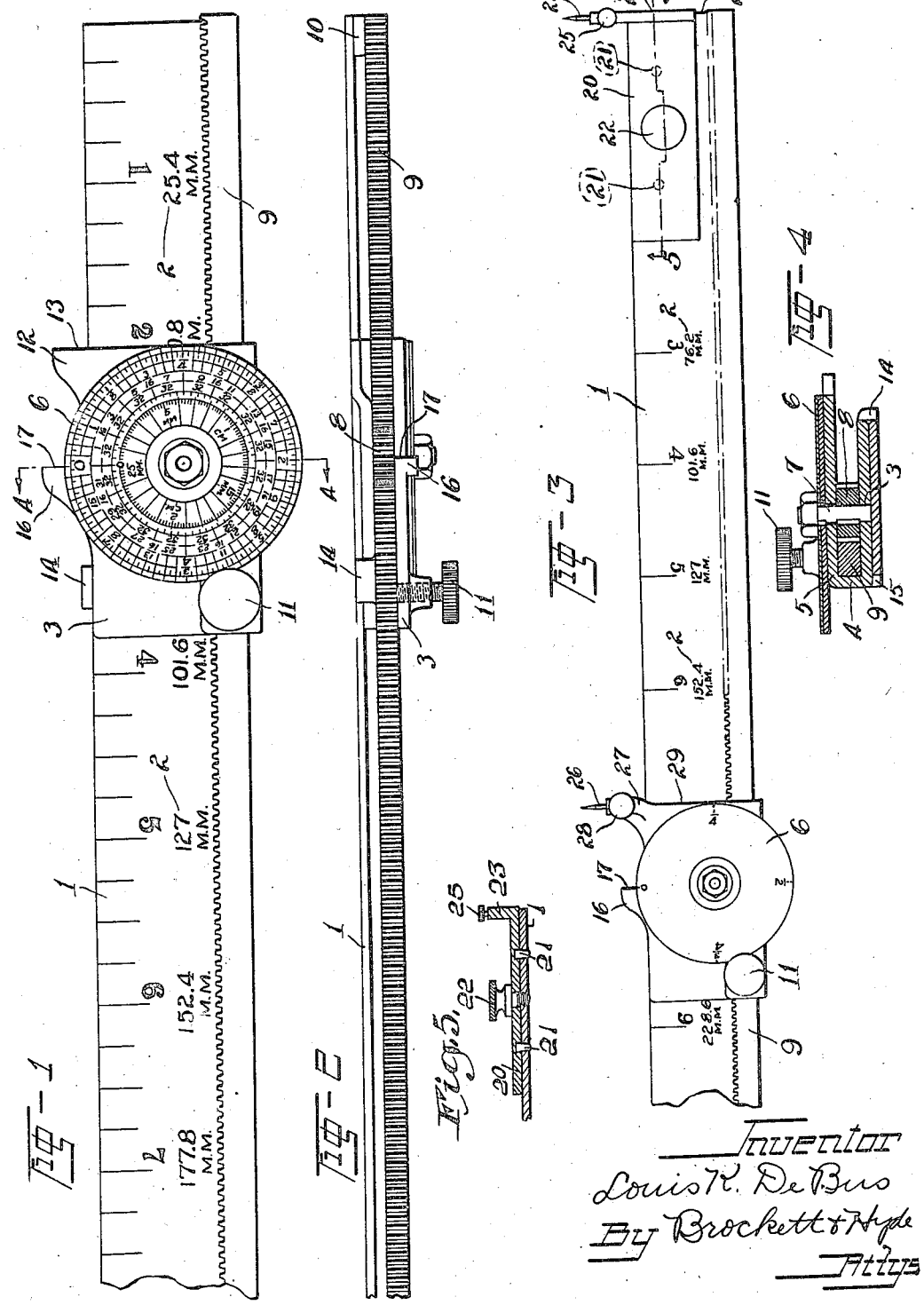

Patented Mar. 4, 1924.

1,485,600

UNITED STATES PATENT OFFICE.

LOUIS K. DE BUS, OF CINCINNATI, OHIO.

MEASURING DEVICE.

Application filed June 24, 1921. Serial No. 480,067.

*To all whom it may concern:*

Be it known that I, LOUIS K. DE BUS, a citizen of the United States, residing at Cincinnati, in the county of Hamilton and State of Ohio, have invented certain new and useful Improvements in Measuring Devices, of which the following is a specification.

This invention relates to improvements in measuring instruments.

It is the object of this invention to provide an improved measuring instrument of the same general type as that disclosed in my co-pending application, Serial No. 465,477, filed April 29, 1921, of which the present application is a continuation.

In the present device what might be termed the coarse measurement is read from the rule itself while the fine measurement or fractional parts of the units of measurement indicated upon the rule are read from the dial which is rotatably mounted upon the carriage which in turn is mounted for slidable movement along the rule. In the present case, however, it is more particularly the object to provide means for adjusting the finger on the carriage along the rule and at the same time and by the same movement to adjust the dial for determining the fine measurement. In other words, it is the object of the present invention to provide a quicker and more convenient means of determining both the coarse and fine measurements by making it possible to determine the exact aggregate measurement by a single operation.

Another object of this invention is to provide means upon the rule and the slidably mounted carriage whereby it is possible to employ the rule as a beam compass.

Other objects of this invention will be apparent from the following description and claims when considered together with the accompanying drawings.

Fig. 1 is a plan view of my invention: Fig. 2 is a side elevation; Fig. 3 is a plan view of my device when adapted for use as a beam compass; Fig. 4 is a section on line 4—4 Fig. 1, Fig. 5 is a sectional view taken on line 5—5, Fig. 3.

The metal rule 1 has indicated thereupon units of measurement, as for instance inches as represented by the numerals 1, 2, 3, 4, etc., together with the quarter inch marks. The corresponding number of millimeters is also indicated opposite the inch marks as shown at 2 for example. The carriage 3 has its base portion in close sliding engagement with the face of the rule while it extends upwardly at its rear portion as indicated at 4 and thence forwardly as indicated at 5 to afford a supporting base for the rotatable dial 6. The dial is fixedly mounted upon the spindle 7 the lower end of which is rotatably fixed in the base portion of the carriage 3 for movement therewith. The spindle 7 extends through the upper portion 5 of the carriage and has keyed thereon a pinion 8 between the base and top portions of the carriage 3. This pinion is adapted for meshing with the rack 9 which extends throughout the full length of the rule 1 and is suitably spaced thereabove by being supported at its ends upon the blocks 10. The rack bar 9 extends through the back portion of the carriage 3, or in other words, the carriage by virtue of its channel construction at the rear as indicated at 4 is adapted for sliding movement along the rack bar. The set screw 11 is mounted in the end of the top portion 5 of the carriage and is adapted to be set for locking engagement with the top of the rack bar 9 so as to lock the carriage in the position to which it has been moved along the rule for determining a measurement.

The carriage 3 has its forward edge portion at one end offset downwardly to provide the finger 12 which is formed with a straight edge 13 for engagement with the body to be measured. The tongue 14 is also turned downwardly from the front edge of the base of the carriage 3 which is also provided with the tongues or lips 15 depending from the rear of the carriage for engagement with the rear edge of the rule 1. These tongues assist in the sliding movement of the carriage along the rule. The finger or projection 16 with the straight edge 17 is provided on the front of the upper portion 5 of the carriage and is intended to serve as a mark from which the fine measurement can be read on the dial 6. It is to be noted that the parts are so constructed and arranged that when the zero mark on the dial is set directly opposite or in alignment with the straight edge 17, the straight edge 13 is then in register with one of the marks of the rule indicating a full or whole unit of measurement, as for instance the inch mark 2 as shown in Fig. 1. The parts are also so constructed and arranged that upon sliding the carriage along the rule for a sufficient distance to cause one complete rotation of the dial the carriage will travel the distance along the rule corresponding to one whole or full unit of measurement, as for instance one inch in the present case. The number of millimeters corresponding to one inch are also indicated upon the dial, these fractional parts being represented upon the inner portion of the dial. The fractional figures shown upon the outer portion of the dial as for instance, $\frac{1}{16}$, $\frac{11}{32}$, etc., refer to fractional portions of the units of measurement, as for instance an inch. Experience has shown that the sub-divisions of an inch and other units of measurement as usually indicated upon a rule, are so minute that it is quite difficult to decipher them and it has proved of great advantage to provide a dial for reading the finer measurement, as has been provided by the applicant. The carriage can be moved along the rule by taking hold of the head of the set screw 11 and using the same as a means of manipulating the carriage along the rule, the pinion 8 as it engages the rack causing rotation of the dial. Then when the finger 12 has been brought to the one end of the body which is to be measured, or in other words when the carriage has been set at the point of proper measurement of the given body, clamp screw 11 is tightened so as to maintain the carriage in such position. Then the whole number of inches or the corresponding number of millimeters is read from the rule and the finer measurement indicated upon the dial in fractional parts of the unit of measurement adapted is added to the coarse measurement read from the rule. The addition of the coarse and finer measurements is the aggregate or exact measurement of the given body.

This invention can also be used as a means of translating a given measurement from terms of one system of measurement into terms of another system of measurement, as explained also in connection with the measuring device in the above cited application, That is to say, a measurement stated in terms of inches can be translated into terms of millimeters by setting the slide at the point along the rule corresponding to the given number of inches and then reading the corresponding number of millimeters upon the dial, and vice versa.

I have provided also a metal plate 20 which is adapted for detachable connection to the one end portion of the rule 1 by means of slightly tapering pins 21 which project from the face of the plate 20 for engagement in corresponding holes through the rule 1. The clamp screw 22 is adapted to secure the plate 20 in such position upon the rule 1. A tubular socket or holder member 23 is provided upon the end of the plate 20 and is adapted to receive the needle or other sharpened member 24 which can be set in said socket by means of the clamping screw 25 in much the same manner as a re-producing needle or stylus is set in its holder on a sound re-producing device. A sharpened marking member as for instance a pencil 26 is clamped in the tubular socket or holding member 27 by means of the set screw 28. The tubular socket 27 is formed upon the base portion of the carriage 3 at the point corresponding to the finger 12. This structure is so arranged that the axis of the socket 27 and consequently the pencil 26 are in alignment with the edge 29; and the point 24 as well as the axis of socket 23 are in alignment with the end of the rule. With this arrangement, the remainder of the structure being the same as in the form of device already described, it is possible to set and lock the carriage in a position corresponding to a given radius 1 which it is desired to describe in the form of an arc or a complete circle; then with the carriage so set, as determined by reading the measurement from the rule and from the dial, the device is ready to be used as a beam compass by placing the point 24 at what will become the center of the arc or circle to be described. The arc or circle is then described by means of the marking point 26.

The advantages flowing from the structure as above described are thought to be obvious to those who are skilled in the art to which my invention relates.

What I claim is:

1. A measuring device comprising a rule with units of measurement indicated thereon, a carriage slidably mounted upon the top face of said rule for movement therealong so as to leave the bottom face of the rule free for application of the same to the work, said carriage having an indicating finger for co-operation with the indications upon said rule, said carriage being provided with a dial for indicating fractional parts of said unit of measurement according to the position of said finger, and means for locking said carriage at any point along said rule.

2. A measuring device comprising a rule with units of measurement indicated thereon, a carriage slidably mounted upon the top face of said rule for movement therealong so as to leave the bottom face of the rule free for application to the work, said carriage having an indicating finger for co-operation with the indications upon said rule, said carriage being provided with a dial for indicating fractional parts of said unit of measurement according to the position of said finger, and means for locking said carriage at any point along said rule, said locking means affording means also for manipulating the carriage along the rule.

3. A measuring device comprising a rule with units of measurement indicated thereon for obtaining the coarse measurement, a carriage mounted upon said rule and having straight line movable connection only with said rule, a finger upon said carriage for co-operation with the indications upon said rule in determining the coarse measurement, a dial rotatably mounted upon said carriage for indicating fractional parts of said unit of measurement according to the position of said finger so as to obtain the fine measurement, and means whereby reciprocatory movement of said carriage will produce rotary movement of said dial.

4. A measuring device comprising a rule with units of measurement indicated thereon for obtaining the coarse measurement, a slidably mounted carriage having an indicating finger for co-operation with said indications in determining the coarse measurement, rack and pinion mechanism actuated by movement of said carriage along said rule, a dial carried by said carriage and having operative connection with said pinion whereby said dial is rotated upon movement of said carriage along said rule, said dial indicating fractional parts of said unit of measurement according to the position of said finger so as to obtain the fine measurement.

5. A measuring device comprising a rule with units of measurement indicated thereon for obtaining the coarse measurement, a rack extending along said rule, a carriage slidably mounted upon said rule and having a pinion rotatably mounted thereon for operative engagement with said rack, a finger on said carriage for co-operation with said indications in determining the coarse measurement, and a dial carried by said carriage and operatively connected with said pinion for rotative movement upon movement of said carriage along said rule, said dial indicating fractional parts of said unit of measurement according to the position of said finger so as to obtain the fine measurement.

6. A measuring device comprising a rule with units of measurement indicated thereon, a rack extending along said rule, a carriage slidably mounted upon said rule and having a pinion rotatably mounted thereon for operative engagement with said rack, a finger on said carriage for co-operating with said indications in determining the coarse measurement, a dial carried by said carriage and operatively connected with said pinion for rotative movement upon movement of said carriage along said rule, said dial indicating fractional parts of said unit of measurement according to the position of said finger so as to obtain the fine measurement, and a set screw carried by said carriage for engagement with said rack for locking said carriage in set position, said set screw being located away from the edge of the rule.

7. A measuring device comprising a rule with corresponding measurements of different systems indicated thereon for obtaining the coarse measurement, a finger movable along said rule for co-operation therewith, a rotatable dial movable along said rule for indicating corresponding fractional parts of units of said systems of measurement for obtaining the fine measurement, movement of said finger and dial along said rule being adapted to effect rotation of said dial, and one rotation of said dial corresponding to the travel of said finger through a predetermined degree.

8. An instrument of precision comprising a rule having indications of measurement thereon, a pointed member having detachable connection with the end of said rule and extending at substantial right angles thereto, a marking member adjustably mounted for movement along said rule and adapted to be set at a given point thereon, and means for locking said marker in set position, said pointed and marking members being adapted for co-operation in describing an arc or the like, and being mounted for movement along the top face of said rule so as to leave the bottom face thereof free for application to the work.

9. A measuring device comprising a rule with units of measurement indicated thereon, a rack extending along the top face of said rule and spaced therefrom, a carriage slidably mounted upon said rack and having a pinion rotatably mounted thereon for operative engagement therewith, a finger on said carriage for co-operation with said indications in determining the coarse measurement, and a dial carried by said carriage and operatively connected with said pinion for rotative movement upon movement of said carriage along said rack, said dial indicating fractional parts of said unit of measurement according to the position of said finger so as to obtain the fine measurement.

In testimony whereof I hereby affix my signature.

LOUIS K. DE BUS.